United States Patent
Propheter-Hinckley et al.

(10) Patent No.: US 11,203,981 B1
(45) Date of Patent: Dec. 21, 2021

(54) BAFFLE SYSTEMS FOR AIRFOILS

(71) Applicant: Raytheon Technologies Corporation, Farmington, CT (US)

(72) Inventors: Tracy A. Propheter-Hinckley, Rocky Hill, CT (US); Allan N. Arisi, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/986,493

(22) Filed: Aug. 6, 2020

(51) Int. Cl.
*F02C 7/28* (2006.01)
*F02C 3/04* (2006.01)
*F01D 5/18* (2006.01)

(52) U.S. Cl.
CPC .................. *F02C 7/28* (2013.01); *F01D 5/18* (2013.01); *F02C 3/04* (2013.01); *F05D 2220/32* (2013.01); *F05D 2240/12* (2013.01); *F05D 2240/55* (2013.01); *F05D 2260/231* (2013.01)

(58) Field of Classification Search
CPC .......... F02C 7/28; F02C 3/04; F02C 2220/32; F02C 2240/12; F02C 2240/55; F02C 2260/231; F01D 5/18; F01D 5/188; F01D 5/189; F01D 5/181; F01D 5/186
See application file for complete search history.

(56) References Cited

U.S. PATENT DOCUMENTS

| | | | |
|---|---|---|---|
| 3,930,748 A | 1/1976 | Redman et al. | |
| 4,168,938 A | 9/1979 | Dodd | |
| 4,461,612 A | 7/1984 | Dodd | |
| 5,630,700 A * | 5/1997 | Olsen | F01D 9/042 415/134 |
| 8,556,578 B1 * | 10/2013 | Memmen | F01D 5/189 415/135 |
| 9,556,750 B2 * | 1/2017 | Freeman | F01D 11/005 |
| 9,611,755 B2 | 4/2017 | Memmen | |
| 10,260,363 B2 | 4/2019 | Snider et al. | |
| 10,294,802 B2 * | 5/2019 | Shi | B32B 5/26 |
| 10,408,090 B2 | 9/2019 | Propheter-Hinckley | |
| 11,078,844 B2 * | 8/2021 | Generale | F01D 9/065 |
| 2019/0153879 A1 * | 5/2019 | Vetters | F01D 9/041 |

* cited by examiner

*Primary Examiner* — Jesse S Bogue
(74) *Attorney, Agent, or Firm* — Cantor Colburn LLP (57) ABSTRACT

Airfoils for gas turbine engines are described. The airfoils include an airfoil body having a pressure and suction side walls and an internal rib and defining a cavity between, at least, the pressure side wall, the suction side wall, and the internal rib. A baffle insert is arranged within the cavity and includes a sealing portion arranged adjacent to the internal rib of the airfoil body with a gap therebetween. A seal element is arranged within the cavity and located in the gap. The seal element is free to move relative to each of the baffle insert and the airfoil body within the gap. When a pressure differential exists across the seal element, the seal element will sealingly engage between sealing portion of the baffle insert and the internal rib of the airfoil body to block a flow through the gap.

20 Claims, 9 Drawing Sheets

BAFFLE SYSTEMS FOR AIRFOILS

BACKGROUND

Exemplary embodiments of the present disclosure pertain to the art of airfoils and more particularly to baffle inserts for airfoils in gas turbine engines.

In gas turbine engines, cooling air may be configured to flow through an internal cavity of an airfoil to prevent overheating. In order to utilize cooling flow efficiently, small cavities that generate high heat transfer are desired. Previously, this has been accomplished using baffles, referred to herein as "space-eater" baffles, to occupy some of the space within the internal cooling cavity and reduce the height and cross-sectional flow area of the internal cavity formed between the baffle wall and the internal surface of the airfoil exterior wall.

When such baffles or baffle inserts are used within airfoil cavities, it may be advantageous to have a preferential cooling flow in the space between the baffle insert and the walls of the airfoil. In some such configures, impingent cooling may be used to direct a mass of air to be released on one side of the baffle and such air may flow around the baffle along the interior surfaces of the airfoil. Such flow may flow to an opposing side of the baffle, thus imparting convection cooling onto hot walls of the airfoil. The cooling flow may then exit through cooling holes into a gas path external to the airfoil.

Along a leading edge of an airfoil, in such cooling schemes, two flow paths are possible. Those familiar with the art will appreciate that the preferred path for the cooling air will be that with the leas pressure resistance. A first flow path will be from an impingement hole and then flowing over convective cooling features, such as trips, fins, dimples, pedestals, etc., around and between the baffle and an airfoil hot wall including the leading edge. In contrast, a second flow path may exist aft of the baffle, between the baffle and an internal rib of the airfoil that defines, in part, a cavity in which the airfoil is installed. It is preferable for the cooling flow to travel along the first, hot wall, path with convective cooling features adjacent the external surface to ensure cooling of the external surfaces of the airfoil exposed to the hot gaspath. Such external surfaces may include, for example, leading edge surfaces, pressure side surfaces, and suction side surfaces. For example, it may be preferable for the bulk of the air to flow the long way around the baffle where convective cooling features are used to augment heat-pickup from the airfoil hot wall. This is compared to the second flow path along a relatively smooth, and in some cases shorter, distance between the internal rib and the baffle. Baffle-to-airfoil wall tolerances are such that the distance between the baffle and the internal rib could be 0.000-0.010 inches depending on how the baffles are installed and can be larger depending on part tolerances and deviations. This gap can allow air to pass through the second flow path along the internal rib, and thus detract from cooling of the hot surfaces of the airfoil. It is preferable to reduce or eliminate this gap. One solution to reduce the gap is to weld the baffle in place as far aftward as possible. However, merely welding the baffle as aft as possible is not a reliable mechanism for maintaining this gap (e.g., due to thermal expansion and material changes or forces during operation). Controlling the position of the baffle within the airfoil and ensuring that intended pressure differentials to encourage the desired cooling flow may be desirable.

BRIEF DESCRIPTION

In accordance with some embodiments, airfoils for gas turbine engines are provided. The airfoils include an airfoil body having a pressure side wall, a suction side wall, and an internal rib extending between the pressure side wall and the suction side wall, wherein the airfoil body defines a cavity between, at least, the pressure side wall, the suction side wall, and the internal rib. A baffle insert is arranged within the cavity, the baffle insert having a sealing portion, wherein the sealing portion of the baffle insert is arranged adjacent the internal rib of the airfoil body and defining a gap therebetween. A seal element is arranged within the cavity and located between the sealing portion of the baffle insert and the internal rib of the airfoil body, wherein the seal element is free to move relative to each of the baffle insert and the airfoil body within the gap, and wherein the seal element is configured to sealingly engage between sealing portion of the baffle insert and the internal rib of the airfoil body due to a pressure differential across the seal element such that a cooling flow of air is blocked through the gap.

In addition to one or more of the features described above, or as an alternative to any of the foregoing embodiments, the airfoils may include that the airfoil body extends between an inner platform and an outer platform.

In addition to one or more of the features described above, or as an alternative to any of the foregoing embodiments, the airfoils may include that the baffle insert is fixedly attached to at least one of the inner platform and the outer platform.

In addition to one or more of the features described above, or as an alternative to any of the foregoing embodiments, the airfoils may include that the seal element is formed of a rope seal.

In addition to one or more of the features described above, or as an alternative to any of the foregoing embodiments, the airfoils may include that the rope seal comprises a woven fiber exterior and a filament interior.

In addition to one or more of the features described above, or as an alternative to any of the foregoing embodiments, the airfoils may include that the woven fiber exterior is formed of at least one of nickel and cobalt.

In addition to one or more of the features described above, or as an alternative to any of the foregoing embodiments, the airfoils may include that the rope seal had a diameter of between about 30 mil and about 60 mil.

In addition to one or more of the features described above, or as an alternative to any of the foregoing embodiments, the airfoils may include that the seal element is formed of a wire.

In addition to one or more of the features described above, or as an alternative to any of the foregoing embodiments, the airfoils may include that the wire is formed of at least one of nickel and cobalt.

In addition to one or more of the features described above, or as an alternative to any of the foregoing embodiments, the airfoils may include that the seal element has a diameter of between 0.010 inch and 0.030 inch.

In addition to one or more of the features described above, or as an alternative to any of the foregoing embodiments, the airfoils may include that the suction side wall of the airfoil body includes one or more cooling holes configured to fluidly connect the cavity to an exterior environment of the airfoil body.

In addition to one or more of the features described above, or as an alternative to any of the foregoing embodiments, the airfoils may include that the baffle insert includes one or more impingement holes arranged along a side of the baffle insert facing the pressure side of the airfoil body.

In addition to one or more of the features described above, or as an alternative to any of the foregoing embodiments, the airfoils may include that the internal rib has a pull angle defined as an angle from a normal line defined between the pressure side wall and the suction side wall of the airfoil body.

In addition to one or more of the features described above, or as an alternative to any of the foregoing embodiments, the airfoils may include that the pull angle is between 3° and 15°.

In addition to one or more of the features described above, or as an alternative to any of the foregoing embodiments, the airfoils may include that the sealing portion of the baffle insert has a pull angle defined as an angle from a normal line defined between the pressure side wall and the suction side wall of the airfoil body.

In addition to one or more of the features described above, or as an alternative to any of the foregoing embodiments, the airfoils may include that the pull angle is between 3° and 15°.

In addition to one or more of the features described above, or as an alternative to any of the foregoing embodiments, the airfoils may include that the cavity is a leading edge cavity of the airfoil.

According to some embodiments, gas turbine engines are provided. The gas turbine engines include a turbine section comprising a plurality of airfoils and a compressor section comprising a plurality of airfoils. At least one airfoil of the plurality of airfoils of the turbine section or at least one airfoil of the plurality of airfoils of the compressor section include an airfoil body having a pressure side wall, a suction side wall, and an internal rib, wherein the airfoil body defines a cavity between, at least, the pressure side wall, the suction side wall, and the internal rib. A baffle insert is arranged within the cavity, the baffle insert having a sealing portion, wherein the sealing portion of the baffle insert is arranged adjacent the internal rib of the airfoil body and defining a gap therebetween. A seal element is arranged within the cavity and located between the sealing portion of the baffle insert and the internal rib of the airfoil body, wherein the seal element is free to move relative to each of the baffle insert and the airfoil body within the gap, and wherein the seal element is configured to sealingly engage between sealing portion of the baffle insert and the internal rib of the airfoil body due to a pressure differential across the seal element such that a cooling flow of air is blocked through the gap.

In addition to one or more of the features described above, or as an alternative to any of the foregoing embodiments, the gas turbine engines may include that the airfoil body extends between an inner platform and an outer platform.

In addition to one or more of the features described above, or as an alternative to any of the foregoing embodiments, the gas turbine engines may include that the seal element is one of a rope seal and a wire.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
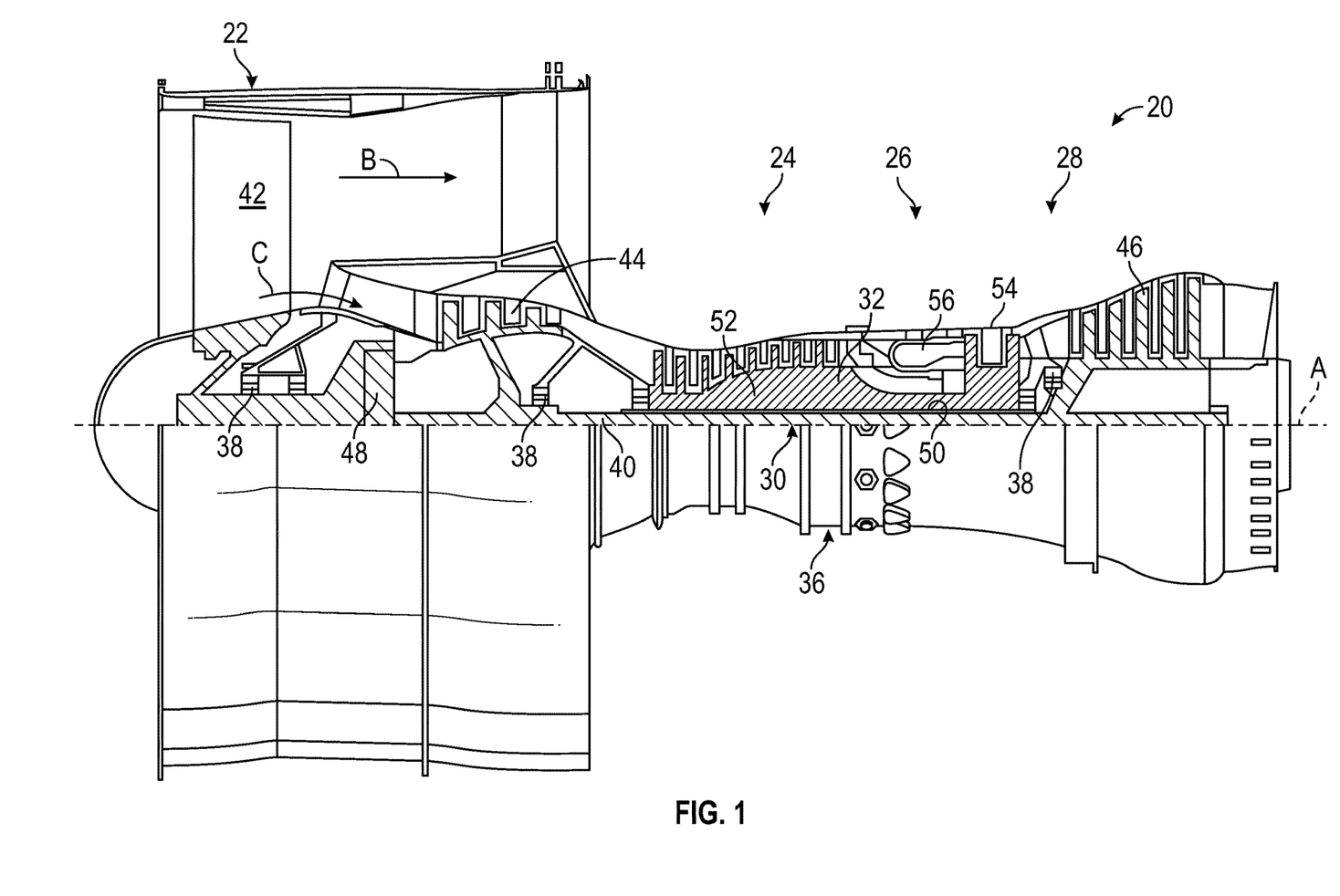
FIG. 1 is a partial cross-sectional view of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engine architectures.

The exemplary engine 20 generally includes a low speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low-pressure compressor 44 and a low-pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high-speed spool 32 includes an outer shaft 50 that interconnects a high-pressure compressor 52 and high-pressure turbine 54. A combustor 56 is arranged in exemplary gas turbine 20 between the high-pressure compressor 52 and the high-pressure turbine 54. An engine static structure 36 is arranged generally between the high-pressure turbine 54 and the low-pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high pressure turbine 54 and low pressure turbine 46. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 m/sec).

Figure 2:
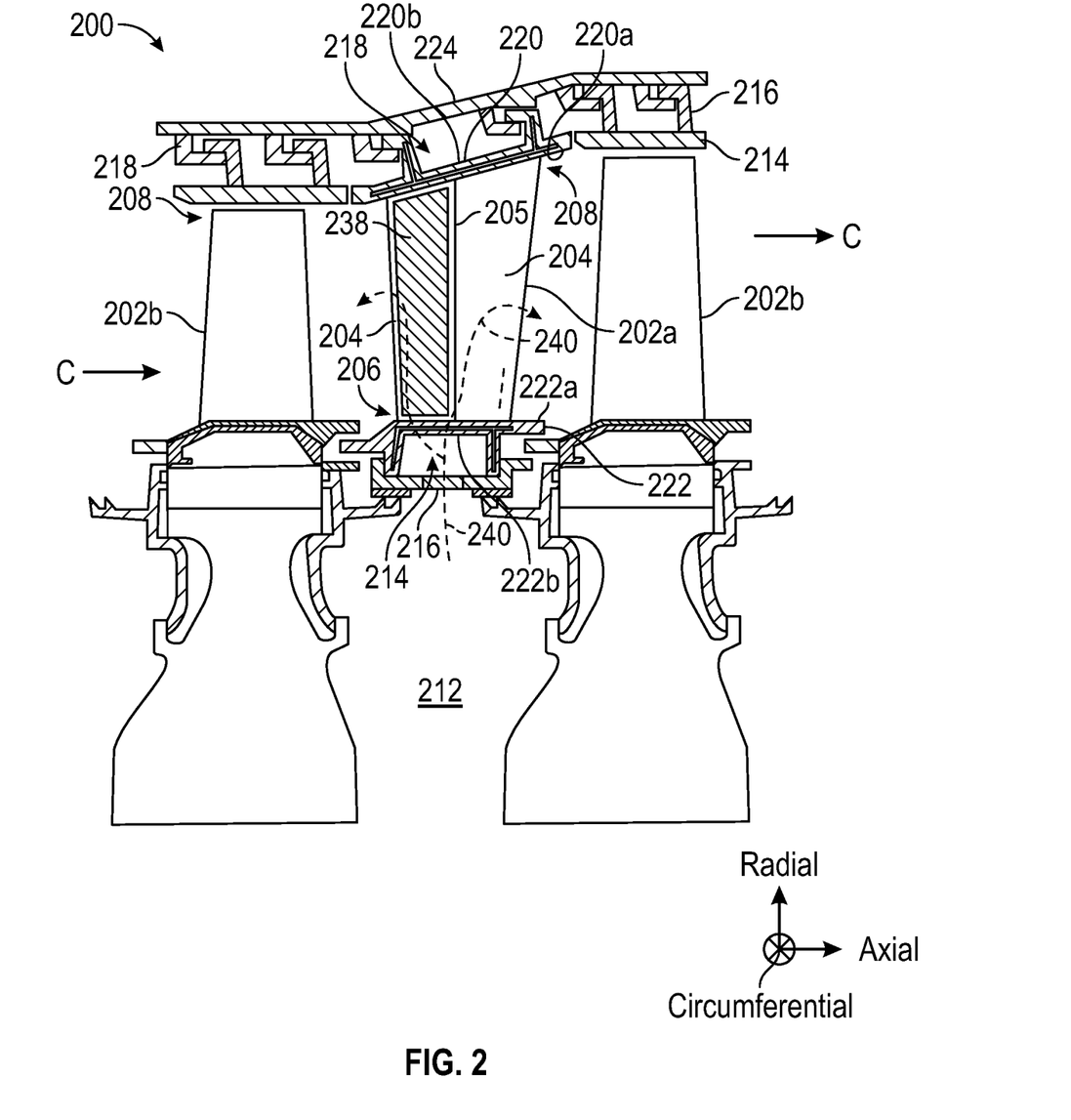
FIG. 2 is a schematic illustration of a gas turbine engine that may incorporate embodiments of the present disclosure.

FIG. 2 is a partial schematic view of a turbine section 200 that may be part of a gas turbine engine as shown and described above. Turbine section 200 includes one or more airfoils 202a, 202b. As shown, some airfoils 202a are stationary stator vanes and other airfoils 202b are blades of turbines disks. The airfoils 202a, 202b, in accordance with embodiments of the present disclosure, are hollow body airfoils with one or more internal cavities 204 defining respective cooling channels (schematically shown in vane 202a). The airfoil cavities 204 are formed within the airfoils 202a, 202b and extend from an inner diameter 206 to an outer diameter 208, or vice-versa. The airfoil cavities 204, as shown in the vane 202a, may be separated by partitions or internal ribs 205 that extend along a radial direction of the respective airfoil, e.g., from the inner diameter 206 or the outer diameter 208 of the vane 202a. Those of skill in the art will appreciate that the partitions or internal ribs 205 that separate and define the airfoil cavities 204 are not usually visible and FIG. 2 is merely presented for illustrative and explanatory purposes. Although not shown, those of skill in the art will appreciate that the blades 202b can include similar cooling passages formed by partitions therein.

The airfoil cavities 204 are configured for cooling airflow to pass through portions of the vane 202a and thus cool the vane 202a. For example, as shown in FIG. 2, an airflow path 240 is indicated by a dashed line. In the configuration of FIG. 2, air flows from a rotor cavity 212 and into an airfoil inner diameter cavity 214 through an orifice 216. The air then flows into and through the airfoil cavities 204 as indicated by the airflow path 240. Positioned at the outer diameter of the vane 202a, as shown, is an outer diameter cavity 218. Although shown with the airflow path 240 originating at an inner diameter, those of skill in the art will appreciate that a cooling airflow can be supplied from an outer diameter (e.g., from the outer diameter cavity 218) or from a combination of inner and outer diameter cavities.

As shown in FIG. 2, the vane 202a includes an outer diameter platform 220 and an inner diameter platform 222. The platforms 220, 222 are configured to enable attachment within and to the gas turbine engine. For example, as appreciated by those of skill in the art, the inner diameter platform 222 can be mounted between adjacent rotor disks and the outer diameter platform 220 can be mounted to a case 224 of the gas turbine engine.

As shown, the outer diameter cavity 218 is formed between the case 224 and the outer diameter platform 220. Those of skill in the art will appreciate that the outer diameter cavity 218 and the inner diameter cavity 214 are outside of or separate from a core flow path C (e.g., a hot gas path). The cavities 214, 218 are separated from the core flow path C by the platforms 220, 222. Thus, each platform 220, 222 includes a respective core gas path surface 220a, 222a and a non-gas path surface 220b, 222b.

A body of the vane 202a, which defines the airfoil cavities 204 therein and forms the shape and exterior surfaces of the vane 202a extends from and between the gas path surfaces 220a, 222a of the respective platforms 220, 222. In some embodiments, the platforms 220, 222 and the body of the vane 202a are formed as a unitary body or structure. In other embodiments, the vane body may be attached to the platforms, as will be appreciated by those of skill in the art.

Air is passed through the cavities of the airfoils to provide cooling airflow to prevent overheating of the airfoils and/or other components or parts of the gas turbine engine. The flow rate through the airfoil cooling cavities may be a relatively low flow rate of air and, as such, the internal velocity and corresponding Reynolds number of the internal cooling air will in turn be relatively low, thereby resulting in poor flow quality and significantly reduced convective cooling characteristics. The resulting internal convective heat transfer coefficients may be too low to achieve desired local metal temperatures of the airfoil exterior walls in order to meet durability oxidation, creep, and thermal mechanical fatigue life goals. One solution to address the low flow rate within the airfoil cavities is to add one or more baffles 238 into the airfoil cavities. That is, in order to achieve desired metal temperatures to meet airfoil full-life with the cooling flow allocated based on turbine engine design, performance, efficiency, and fuel consumption requirements, "space-eater" baffles 238 may be used inside airfoil cooling passages (e.g., within the airfoil cavities 204 shown in FIG. 2).

The "space-eater" baffle serves as a way to consume internal cavity area/volume in order to reduce the available cross-sectional area through which cooling air can flow. This enables the local flow per unit area to be increased which in turn results in higher cooling cavity Reynolds Numbers and internal convective heat transfer. In some circumstances, depending upon the method of manufacture, the radial cooling cavities 204 must be accessible to allow for the insertion of the "space-eater" baffles.

Figure 3A:
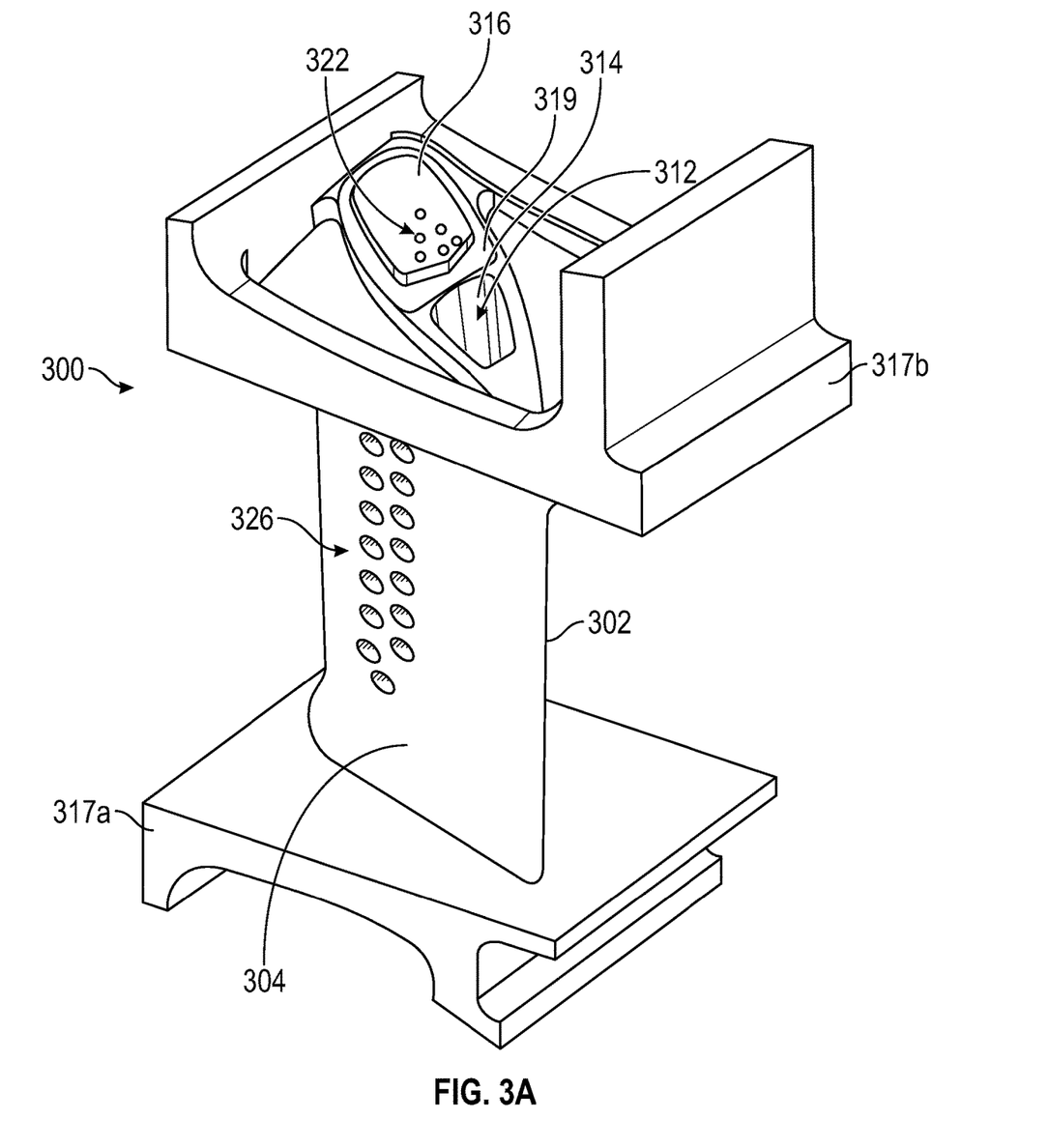
FIG. 3A is a schematic illustration of an airfoil that may incorporate embodiments of the present disclosure.
Figure 3B:
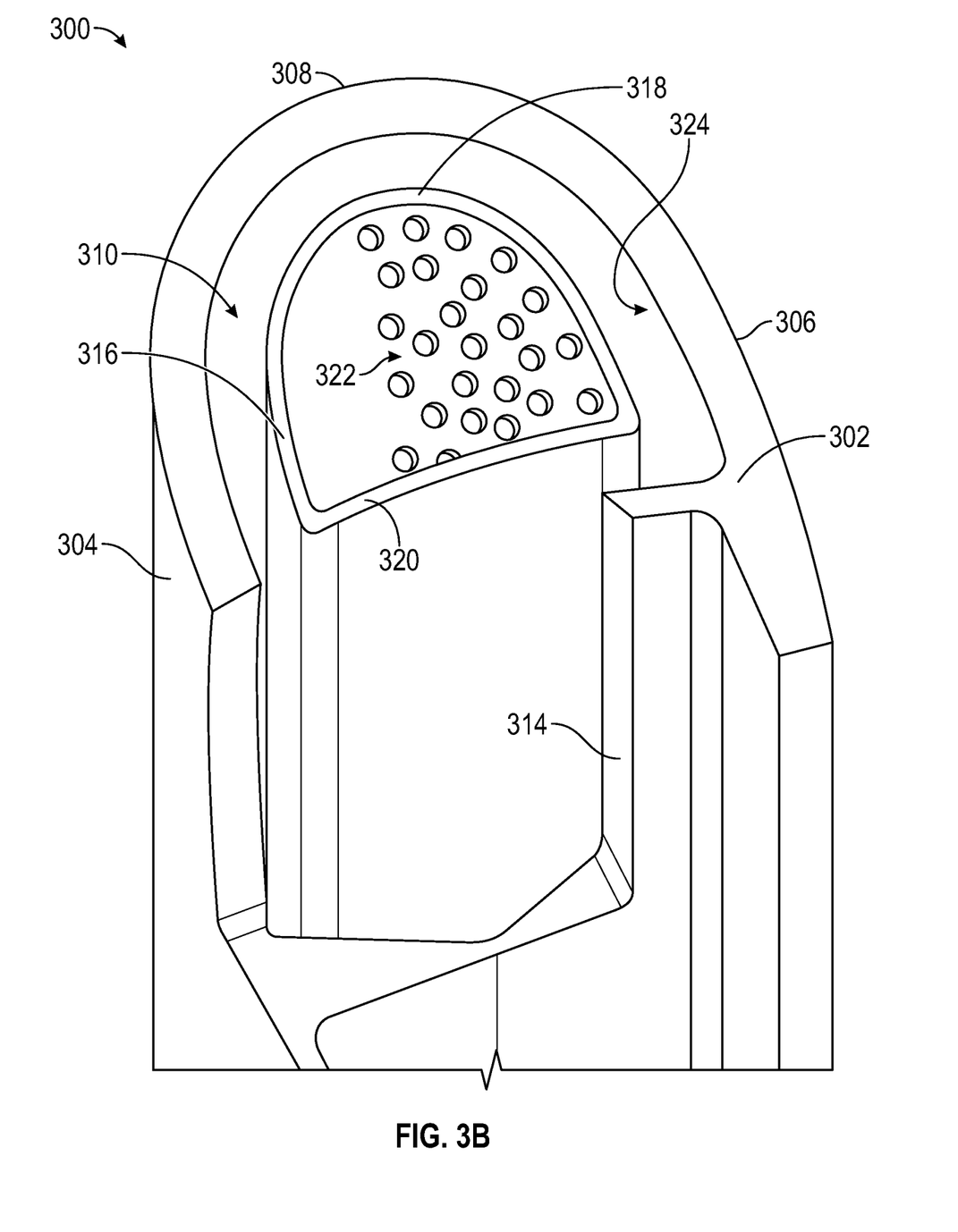
FIG. 3B is a partial cut away view of the airfoil of FIG. 3A.
Figure 3C:
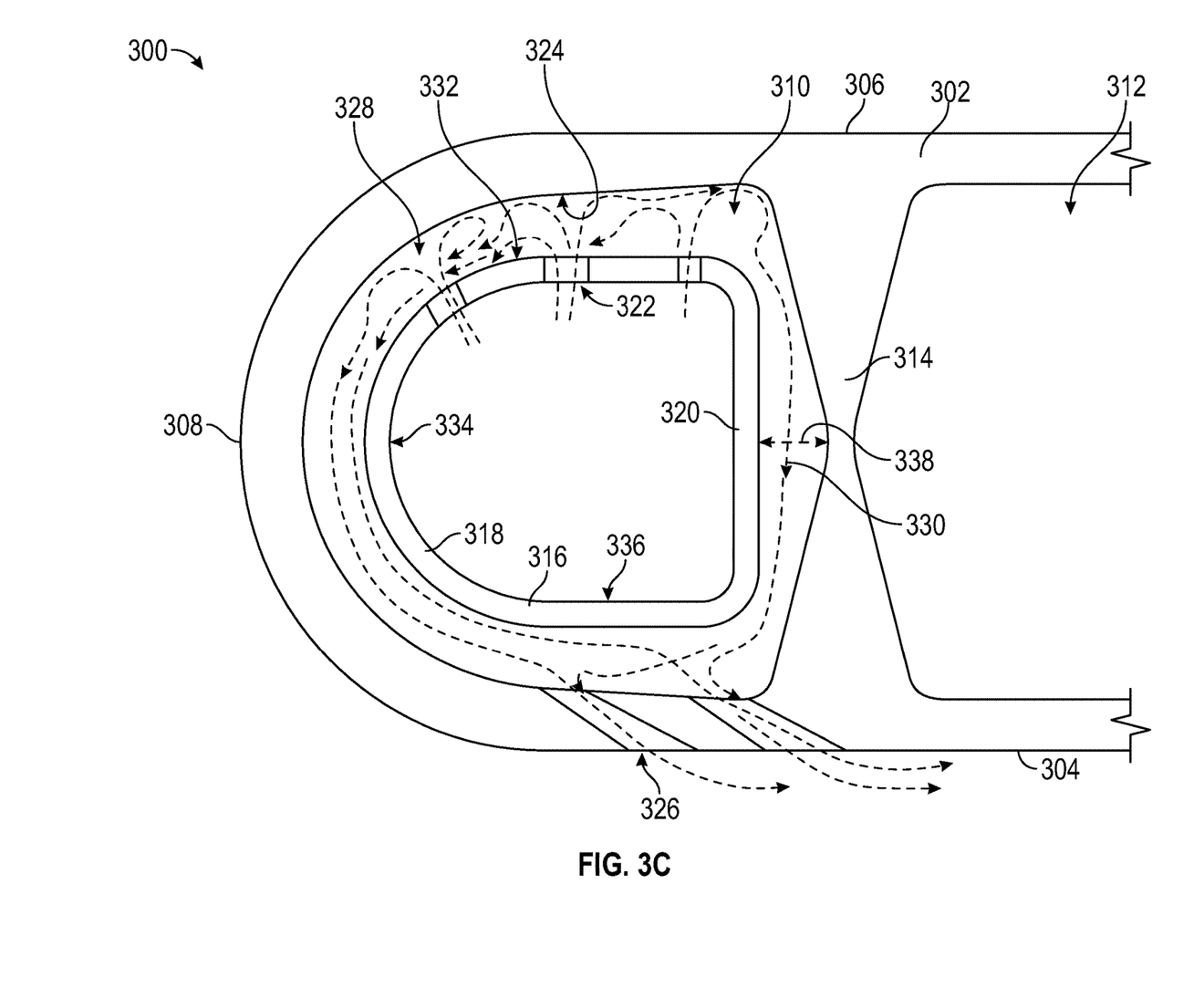
FIG. 3C is a cross section view of the airfoil of FIG. 3A.

Turning now to FIGS. 3A-3C, schematic illustrations of an airfoil 300 that may incorporate embodiments of the present disclosure is shown. The airfoil 300 may be a vane for use in a gas turbine engine. As shown in FIGS. 3A-3C, the airfoil 300 has an airfoil body 302 having a suction side wall 304, a pressure side wall 306, and a leading edge 308. The airfoil 300 may be arranged within and operated in a hot section of a gas turbine engine, and thus cooling of the material of the airfoil body 302 is desirable to ensure part life and prevent fatigue. The airfoil 300 includes one or more internal cavities. For example, as shown in FIGS. 3A-3C, a leading edge cavity 310 and a main body cavity 312 are defined within the airfoil body 302. The leading edge cavity 310 and the main body cavity 312 are separated or divided by an internal rib 314. The internal rib 314 extends between the suction side wall 304 and the pressure side wall 306. As shown in FIGS. 3B-3C, the internal rib 314 may have a narrowing or tapering geometry.

As shown, a baffle insert 316 is arranged within the leading edge cavity 310. The baffle insert 316 may be attached to one or both of an inner platform 317a and an outer platform 317b. The baffle insert 316 has a forward portion 318 and an aft portion 320. As shown in FIG. 3A, the baffle insert 316 may be affixed to the outer platform 317b by welding at a flange 319. The forward portion 318 of the baffle insert 316 is defined as the portions or sections of the baffle insert 316 that are arranged adjacent to external hot walls of the airfoil body 302 (e.g., along the suction side wall 304, the pressure side wall 306, and the leading edge 308). The aft portion 320 of the baffle insert 316 is arranged proximate the internal rib 314 and faces an internal wall of the airfoil body 302. The baffle insert 316 includes one or more impingement holes 322 arranged about the forward portion 318. In this illustrative embodiment no holes are arranged on the aft portion 320. The impingement holes 322 in this illustrative embodiment are arranged only along the pressure side wall 306 of the airfoil 300. In other configurations, alternative locations or additional impingement holes may be employed, without departing from the scope of the present disclosure.

The impingement holes 322 are arranged to direct air from within the baffle insert 316 into contact with hot surfaces 324 of the airfoil body 302. The hot surfaces 324 of the airfoil body 302 are portions of the airfoil body 302 that are exposed to hot exterior (e.g., hot gas path) gasses. As such, the hot surfaces 324 are along the suction side wall 304, the pressure side wall 306, and the leading edge 308 of the airfoil body 302. The impinging air will impinge upon the hot surfaces 324 and then travel around the baffle insert 316 in the leading edge cavity 310 in the space between the baffle insert 316 and the hot surfaces 324. In some embodiments, the hot surfaces 324 of the airfoil body 302 can include trip strips, pedestals, fins, or other features that may impact the flow of air and enable increased cooling of the hot surfaces 324, as will be appreciated by those of skill in the art.

As shown in FIG. 3C, the airfoil body 302, as shown, includes cooling holes 326 along the suction side wall 304 of the leading edge cavity 310. These cooling holes 326 may expel air sourced from the impingement holes 322. During operation, the presence of the cooling holes 326 will cause a pressure differential and flow path for the air from the baffle insert 316. The impingement holes 322 in this embodiment, as shown, will expel air into the leading edge cavity 310 and a first flow path 328 is defined from the impingement holes 322, along the hot surfaces 324 extending forward from the impingement holes 322 along the pressure side wall 306, around the leading edge 308, along the suction side wall 304, and out through the cooling holes 326. A second, and in some cases shorter, flow path 330 is defined as extending from the impingement holes 322, flowing aft to the area between the aft portion 320 of the baffle insert 316 and the internal rib 314, and then out the cooling holes 326. The air that flow along the second flow path 330 may be considered wasted cooling due to the path along the internal rib 314 which does not include or define a portion of the hot surfaces 324 in the leading edge cavity 310.

In FIG. 3C, air flow is represented by dashed lines and exits the baffle insert 316 on a pressure side 332 of the baffle insert 316 and impinges on the pressure side wall 306 of the airfoil 300. The air can flow in a forward direction along the first flow path 328 between the leading edge 308 of the airfoil 300 and a leading edge 334 of the baffle insert 306 to the suction side wall 304 and a suction side 334 of the baffle insert 316. The air will then exit out the cooling holes 326 on the suction side wall 304 of the airfoil body 302. The first flow path 328 is the preferred path because it imparts the greatest amount of heat transfer between the hot surfaces 324 of the airfoil body 302 and the cooling air. However, because there is a gap 338 between the aft portion 320 of the baffle insert 316 and the internal rib 314, air exiting baffle insert 316 can also flow aftward along the second flow path 330 and through the gap 338 to the cooling holes 326 on the suction side wall 304. Such flow along the second flow path 330 may cause back pressure and reduce the effectiveness of the preferred first flow path 328.

To prevent airflow along the second flow path, aft of the baffle insert, embodiments of the present disclosure are directed to including a seal element arranged within the gap formed between the aft portion of the baffle insert and the internal rib of the airfoil body. The seal elements may be substantially free floating such that a pressure differential across the seal element causes the seal element to sealingly engage between the aft portion of the baffle insert and the internal rib of the airfoil body. Using this configuration, the sealing element will seal or block airflow along the second flow path and cause the cooling air from the baffle insert to impinge upon hot surfaces of the airfoil body and then flow to the cooling holes of the airfoil body. As provided herein, the free floating seal elements may be completely separate elements or structures from the airfoil, the baffle insert, and/or the platforms of a vane in which the seal elements are used. In some embodiments, the seal elements may be described as not attached, affixed, or otherwise connected to the other components of the system or held in place by a support structure or mechanism. Such free floating or free-to-move seal elements allows for a pressure differential across the seal element to cause a sealing engagement, as described herein. In some embodiments, no ribs, channels, connectors, or other support/joining elements/structures may be used to hold the seal elements in place. The seal elements, described herein, may be free to move relative to both the baffle insert and an internal rib or structure of an airfoil. Upon a pressure differential being generated across the seal element, the seal element will move into sealing engagement, as described herein.

Figure 4A:
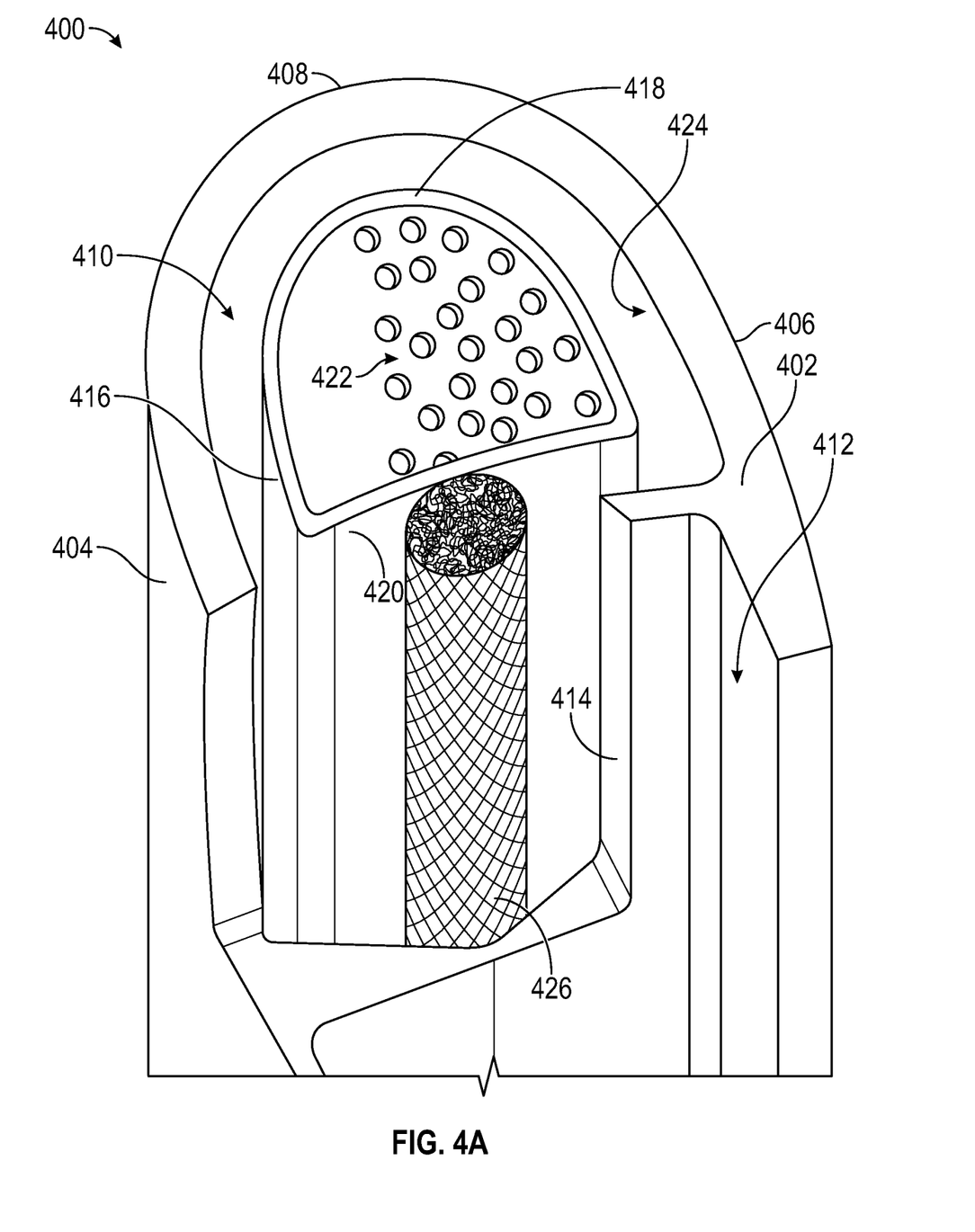
FIG. 4A is schematic illustration of an airfoil in accordance with an embodiment of the present disclosure.
Figure 4B:
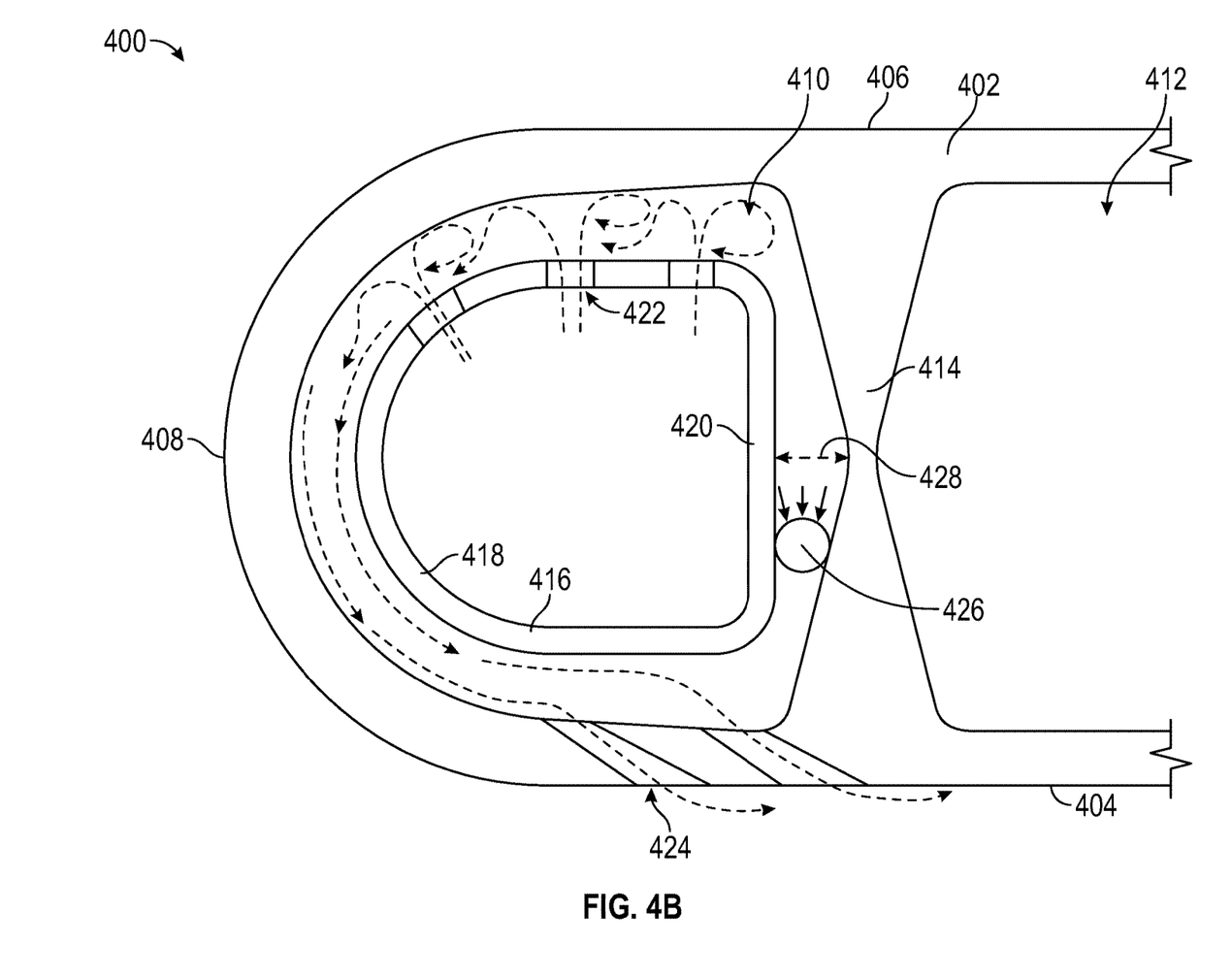
FIG. 4B is a cross section view of the airfoil of FIG. 4A.

For example, turning now to FIGS. 4A-4B, schematic illustrations of an airfoil 400 in accordance with an embodiment of the present disclosure are shown. The airfoil 400 may be a vane for use in a gas turbine engine, for example as shown and described above. The airfoil 400 has an airfoil body 402 having a suction side wall 404, a pressure side wall 406, and a leading edge 408. The airfoil 400 defines a leading edge cavity 410 and a main body cavity 412 within the airfoil body 402. The leading edge cavity 410 and the main body cavity 412 are separated or divided by an internal rib 414. The internal rib 414 extends between the suction side wall 404 and the pressure side wall 406. As shown in FIGS. 4A-4B, the internal rib 414 may have a narrowing or tapering geometry.

A baffle insert 416 is arranged within the leading edge cavity 410. The baffle insert 416 has a forward portion 418 and an aft portion 420. The forward portion 418 of the baffle insert 416 is defined as the portions or sections of the baffle insert 416 that are arranged adjacent to external hot walls of the airfoil body 402 (e.g., along the suction side wall 404, the pressure side wall 406, and the leading edge 408). The aft portion 420 of the baffle insert 416 is arranged proximate the rib 416 and faces an internal wall of the airfoil body 402. The baffle insert 416 includes one or more impingement holes 422 arranged about the forward portion 418. In this illustrative embodiment no holes are arranged on the aft portion 420. The impingement holes 422 in this illustrative embodiment are arranged only along the pressure side wall 406 of the airfoil body 402. In other configurations, alternative locations or additional impingement holes may be employed, without departing from the scope of the present disclosure. The suction side wall 404 of the airfoil body 402 includes cooling holes 424. The cooling holes 424 may be configured to expel cooling air along the exterior surface of the airfoil body 402 to form a film cooling boundary layer on the exterior surface thereof.

As shown in this illustrative embodiment, a seal element 426 is arranged in a gap 428 between the aft portion 420 of the baffle insert 416 and the internal rib 414. Accordingly, as referred to herein, a portion of the baffle insert may be referred to as a sealing portion that provides a surface along which a seal element 426 may move and sealingly engage. The seal element 426 is a substantially cylindrical structure that is free to move along the aft portion 420 of the baffle insert 416 and the internal rib 414 within the leading edge cavity 410. The gap 428 between the aft portion 420 of the baffle insert 416 and the internal rib 414 of the airfoil body 402 is blocked by the seal element 426. The seal element 426, in accordance with some embodiments, and without limitation, can be made of a rope seal which results in a compliant seal. In other embodiments, the seal element 426 can be made of a straight piece of wire. Various other arrangements and configurations of the seal element may be possible without departing from the scope of the present disclosure. Because the seal element 426 is free to move relative to the baffle insert 416 and the internal rib 414, during operation, the seal element 426 may be pushed into place by a pressure differential across the seal element 426. The pressure differential is generated by high pressure impingement air supplied through the impingement holes 422 and the air being expelled through the cooling holes 424 in the suction side wall 404 causes a lower pressure. Due to this, the seal element 426 will be urged toward the suction side wall 404 and will be wedged into sealing engagement with the material of the aft portion 420 of the baffle insert 416 and the internal rib 414 of the airfoil body 402.

A rope seal structure of the seal element 426 may be used in configurations where the internal rib 414 of the airfoil body 402 or the aft portion 420 of the baffle insert 416 is not straight in a radial direct (e.g., between an inner platform and an outer platform). The wire structure of the seal element 426 provides for a solid and potentially rigid seal structure and thus may require the rib of the airfoil to be straight in a radial direction so as to allow the wire to roll freely. In some embodiment, both the baffle insert and/or the rib may have angled walls to aid in directly the sealing provided by the seal element.

Figure 5:
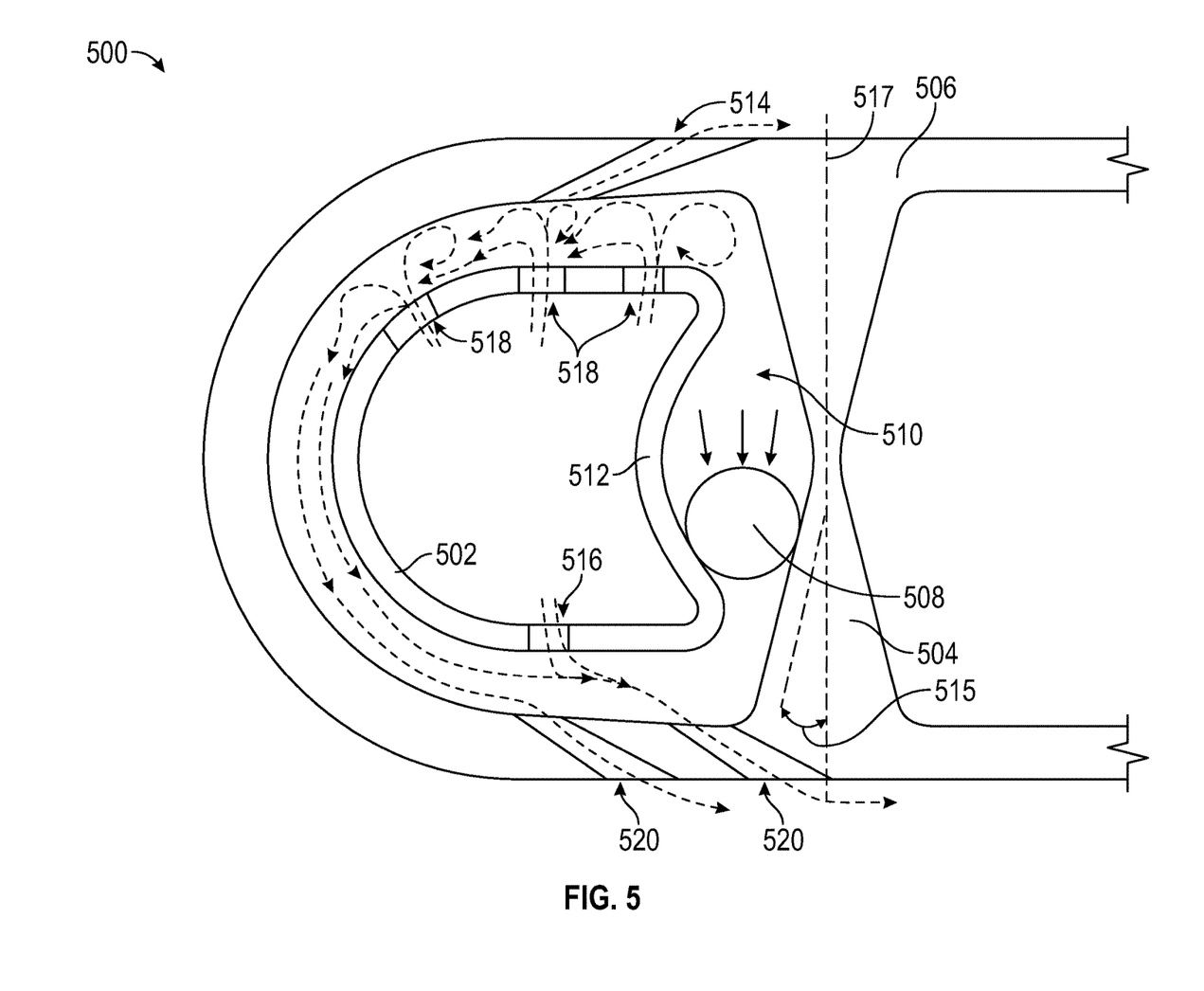
FIG. 5 is a schematic illustration of an airfoil in accordance with an embodiment of the present disclosure.

For example, turning to FIG. 5, a schematic illustration of an airfoil 500 in accordance with an embodiment of the present disclosure is shown. In FIG. 5, a baffle insert 502 is installed within an airfoil cavity forward of an internal rib 504 of an airfoil body 506. A seal element 508 is arranged within a gap 510 between a curved aft portion 512 of the baffle insert 502 and the internal rib 504, which has a tapering or curved geometry. As shown in FIG. 5, the internal rib 504 may have a pull angle 515 that is an angle defined from a line 517 normal from one side to the other side of the airfoil body 506 (e.g., normal to both the pressure side and the suction side of the airfoil body 506). In this embodiment the internal rib 504 has a relatively large pull angle 515 so as to create a channel for the seal element 508 between the curved aft portion 512 of the baffle insert 502 and the internal rib 504 of the airfoil body 506. Pull angles, in accordance with embodiments of the present disclosure, may range from about 3° to about 15°, and may be present on one or both of the aft portion of the baffle insert and the internal rib of the airfoil body.

Also shown in FIG. 5, the airfoil body 506 can include additional cooling holes 514 and the baffle insert 502 can include additional impingement holes 516. However, even with such additional cooling holes 514 and additional impingement holes 516, a predominant cooling flow path will flow from primary impingement holes 518 of the baffle insert 502 to primary cooling holes 520 which breakout of the airfoil body 506 with lowest external surface sink pressure. That is, the primary impingement holes 518 and the primary cooling holes 520 are arranged to define a primary flow path of cooling air from the baffle insert 502 to an exterior of the airfoil body 506. Although other cooling holes and impingement holes may be present, such holes do not alter the cooling flow path of the primary flow path that travels form the primary impingement holes 518 to the primary cooling holes 520. As such, a pressure differential will exist across the seal element 508 and it will be urged into sealing engagement as described herein.

Figure 6:
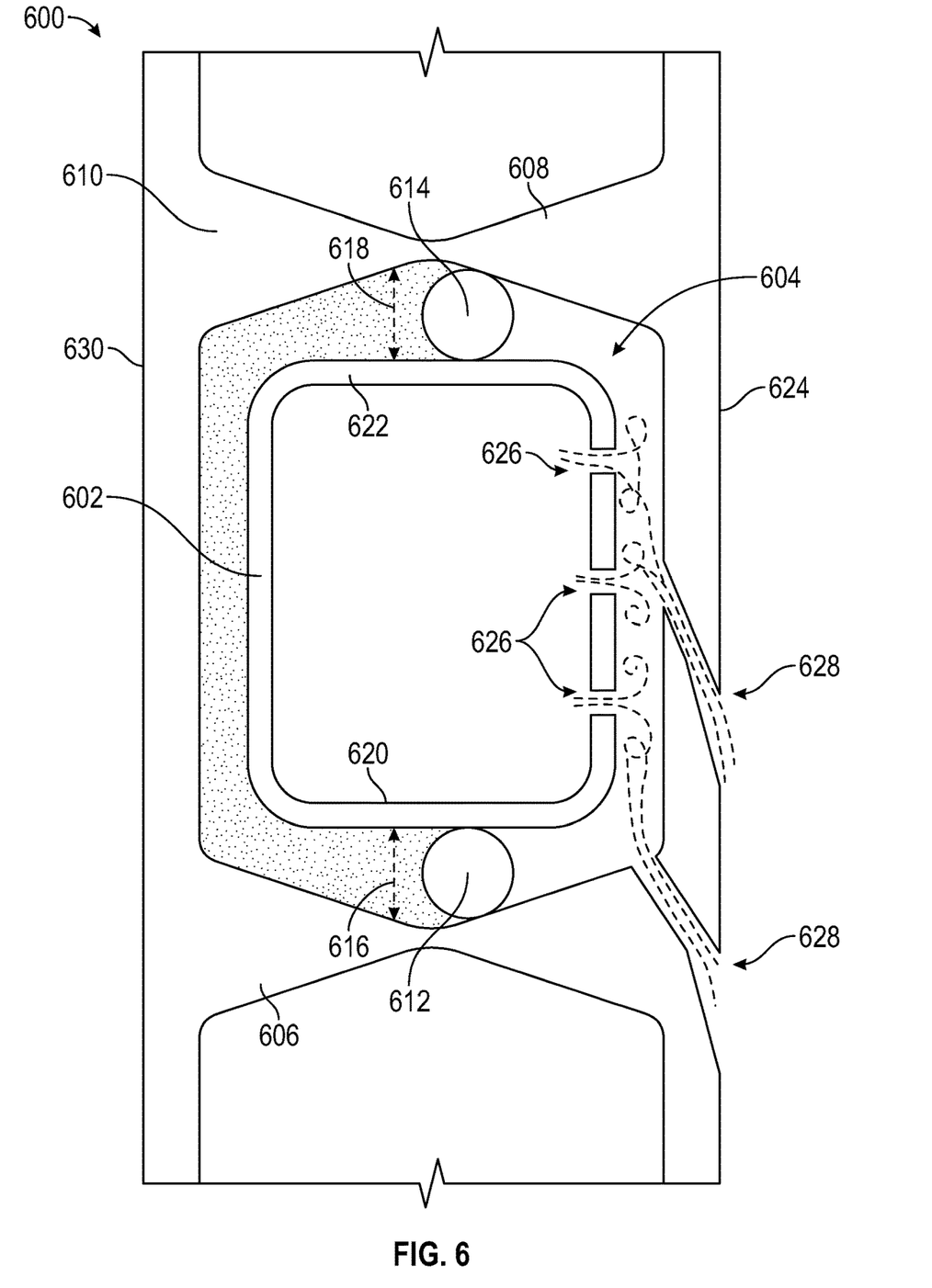
FIG. 6 is a schematic illustration of an airfoil in accordance with an embodiment of the present disclosure.

FIG. 6 is a schematic illustration of an airfoil 600 in accordance with an embodiment of the present disclosure is shown. In FIG. 6, a baffle insert 602 is installed within an airfoil cavity 604 arranged between two internal ribs 606, 608 of an airfoil body 610. The airfoil cavity 604, in this embodiment, is a mid-body cavity, and is thus not located at a leading edge of the airfoil 600. In this embodiment, two seal elements 612, 614 are arranged within gaps 616, 618 between a respective sealing portion 620, 622 of the baffle insert 602 and the respective internal ribs 606, 608. As show, the baffle insert 602 has substantially straight walls for the sealing portions 620, 622 along the gaps 616, 618, and the internal ribs 606, 608 have tapering or curved geometries. Along a pressure side wall 624 of the airfoil body 610 a lower pressure is achieved using impingement holes 626 in the baffle insert 602 and cooling holes 628 in the pressure side wall 624. In contrast, a suction side wall 630 may employ radial flow convective cooling between the baffle insert 602 and the suction side wall 604. Because the air along the suction side wall 630 is radial flow and does not exit the airfoil, and the cooling holes 628, in combination with the impingement holes 626, provides a pressure differential toward the pressure side wall 624. This pressure differential causes both seal elements 612, 614 to be urged toward the pressure side wall 624 and be wedged into place between the sealing portions 620, 622 of the baffle insert 602 and the respective internal ribs 606, 608 of the airfoil body 610.

The seal elements of the present disclosure provide a benefit of reducing a parasitic leak along the aft portion of the baffle insert. As disclosed herein, the seal elements are substantially free floating and are not attached to either the baffle insert or the internal rib of the airfoil body. Such free floating configuration allows for compensation and movement while maintaining a sealing engagement. For example, due to thermal changes during operation of a gas turbine engine, the gap between the aft potion of the baffle insert and the internal rib may change in dimension (e.g., due to thermal expansion). Because the seal element is not fixed to either of the structures it forms a seal between, these components are free to thermally expand and contract without breaking the seal or suffering from material fatigue due to a joint between the seal element and the respective component. It will be appreciated that embodiments of the present disclosure operate based on different pressures from one side to the other within an airfoil cavity. As shown in FIG. 6, multiple seals may be employed in a single cavity.

A rope seal configuration may include a woven fiber wrapped about an internal fiber structure. The wire configuration may be a solid wire material. During installation of the seal elements, the seal element may be coated with a material that vaporizes at engine temperatures but can temporarily join the seal element to the aft portion of the baffle insert. In accordance with some configurations, the rope seal-type seal elements may have a diameter of between, for example, 0.030-0.060 inch. In accordance with some configurations, the wire-type seal elements may have a diameter of between, for example, 0.010-0.030 inch. The rope seal-type seal elements, in accordance with some embodiments, may be formed from braided nickel or cobalt forming an external lattice wrap around a non-metallic, high temperature filament. The wire-type seal elements, in accordance with some embodiments, may be formed from nickel or cobalt. Other high temperature materials may be employed for either type of seal element. As used herein with respect to the seal elements, "high temperature material" refers to a material having a melting point of about 800° F. or greater.

Advantageously, embodiments of the present disclosure provide for a seal element to be arranged in an airfoil having a baffle insert. The seal element is configured to form a fluid seal between an aft portion of the baffle insert and an internal rib of the airfoil. The fluid seal provided by the seal elements of the present disclosure may not be perfect seals, allowing for some amount of bleed or parasitic loss along the aft portion of the baffle insert. However, advantageously, embodiments of the present disclosure provide for ensuring that all or most of a cooling flow of air will travel along a preferred path (i.e., along hot surfaces of the airfoil body).

The terms "about" and "substantially" are intended to include the degree of error associated with measurement of the particular quantity based upon the equipment available at the time of filing the application. For example, "about" and/or "substantially" can include a range of ±8% or 5%, or 2% of a given value. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
   an airfoil body having a pressure side wall, a suction side wall, and an internal rib extending between the pressure side wall and the suction side wall, wherein the airfoil body defines a cavity between, at least, the pressure side wall, the suction side wall, and the internal rib;
   a baffle insert arranged within the cavity, the baffle insert having a sealing portion, wherein the sealing portion of the baffle insert is arranged adjacent the internal rib of the airfoil body and defining a gap therebetween; and
   a seal element arranged within the cavity and located between the sealing portion of the baffle insert and the internal rib of the airfoil body, wherein the seal element is free to move relative to each of the baffle insert and the airfoil body within the gap, and wherein the seal element is configured to sealingly engage between sealing portion of the baffle insert and the internal rib of the airfoil body due to a pressure differential across the seal element such that a cooling flow of air is blocked through the gap.

2. The airfoil of claim 1, wherein the airfoil body extends between an inner platform and an outer platform.

3. The airfoil of claim 1, wherein the baffle insert is fixedly attached to at least one of the inner platform and the outer platform.

4. The airfoil of claim 1, wherein the seal element is formed of a rope seal.

5. The airfoil of claim 4, wherein the rope seal comprises a woven fiber exterior and a filament interior.

6. The airfoil of claim 5, wherein the woven fiber exterior is formed of at least one of nickel and cobalt.

7. The airfoil of claim 4, wherein the rope seal had a diameter of between about 30 mil and about 60 mil.

8. The airfoil of claim 1, wherein the seal element is formed of a wire.

9. The airfoil of claim 8, wherein the wire is formed of at least one of nickel and cobalt.

10. The airfoil of claim 8, wherein the seal element has a diameter of between 0.010 inch and 0.030 inch.

11. The airfoil of claim 1, wherein the suction side wall of the airfoil body includes one or more cooling holes configured to fluidly connect the cavity to an exterior environment of the airfoil body.

12. The airfoil of claim 1, wherein the baffle insert includes one or more impingement holes arranged along a side of the baffle insert facing the pressure side of the airfoil body.

13. The airfoil of claim 1, wherein the internal rib has a pull angle defined as an angle from a normal line defined between the pressure side wall and the suction side wall of the airfoil body.

14. The airfoil of claim 13, wherein the pull angle is between 3° and 15°.

15. The airfoil of claim 1, wherein the sealing portion of the baffle insert has a pull angle defined as an angle from a normal line defined between the pressure side wall and the suction side wall of the airfoil body.

16. The airfoil of claim 15, wherein the pull angle is between 3° and 15°.

17. The airfoil of claim 1, wherein the cavity is a leading edge cavity of the airfoil.

18. A gas turbine engine comprising:
a turbine section comprising a plurality of airfoils; and
a compressor section comprising a plurality of airfoils;
wherein at least one airfoil of the plurality of airfoils of the turbine section or at least one airfoil of the plurality of airfoils of the compressor section comprises:
an airfoil body having a pressure side wall, a suction side wall, and an internal rib, wherein the airfoil body defines a cavity between, at least, the pressure side wall, the suction side wall, and the internal rib;
a baffle insert arranged within the cavity, the baffle insert having a sealing portion, wherein the sealing portion of the baffle insert is arranged adjacent the internal rib of the airfoil body and defining a gap therebetween; and
a seal element arranged within the cavity and located between the sealing portion of the baffle insert and the internal rib of the airfoil body, wherein the seal element is free to move relative to each of the baffle insert and the airfoil body within the gap, and wherein the seal element is configured to sealingly engage between sealing portion of the baffle insert and the internal rib of the airfoil body due to a pressure differential across the seal element such that a cooling flow of air is blocked through the gap.

19. The gas turbine engine of claim 18, wherein the airfoil body extends between an inner platform and an outer platform.

20. The gas turbine engine of claim 18, wherein the seal element is one of a rope seal and a wire.

* * * * *